United States Patent [19]

Mack

[11] Patent Number: 4,493,904
[45] Date of Patent: Jan. 15, 1985

[54] CATALYST AND METHOD FOR PREPARATION OF DRAG REDUCING SUBSTANCES

[75] Inventor: Mark P. Mack, Ponca City, Okla.

[73] Assignee: Conoco Inc., Ponca City, Okla.

[21] Appl. No.: 525,525

[22] Filed: Aug. 22, 1983

Related U.S. Application Data

[60] Division of Ser. No. 278,264, Jun. 29, 1981, Pat. No. 4,415,714, Continuation-in-part of Ser. No. 7,125, Jan. 29, 1979, abandoned, Continuation-in-part of Ser. No. 606, Jan. 2, 1979, abandoned.

[51] Int. Cl.$^3$ .............................................. C08F 4/64
[52] U.S. Cl. ................................... 502/122; 502/124; 502/126; 526/125; 526/142
[58] Field of Search ................ 502/126, 124, 119, 122

[56] References Cited

U.S. PATENT DOCUMENTS

| | | | |
|---|---|---|---|
| 3,116,274 | 12/1963 | Boehm et al. | 502/126 X |
| 3,156,681 | 11/1964 | Kavesh | 502/126 X |
| 4,124,530 | 11/1978 | Arzoumanidis | 502/125 X |
| 4,142,991 | 3/1979 | Arzoumanidis et al. | 502/105 X |

*Primary Examiner*—Patrick Garvin

[57] ABSTRACT

An improved Ziegler/Natta catalyst for the polymerization of $\alpha$-olefins containing from 2 to 30 carbon atoms, comprising titanium halide and organoaluminum cocatalyst modified by addition of ketones and monoethers. Metal halides can be used to further modify the catalyst.

13 Claims, No Drawings

CATALYST AND METHOD FOR PREPARATION OF DRAG REDUCING SUBSTANCES

This is a division, of application Ser. No. 278,264 (filed June 29, 1981) U.S. Pat. No. 4,415,714 which is a continuation-in-part of U.S. Ser. No. 7,125 (filed Jan. 29, 1979) abandoned which is a continuation-in-part of U.S. Ser. No. 000,606 (filed Jan. 2, 1979) abandoned.

This invention relates to a catalyst and method for the production of ultrahigh molecular weight hydrocarbon soluble polymers suitable for use as drag reducing agents. More particularly, this invention provides a catalyst and method for the production of ultrahigh molecular weight non-crystalline hydrocarbon soluble polymers using a modified Ziegler-Natta system while ceasing polymerization at low levels of polymer conversion.

It is well known that alpha-olefins may be polymerized in the presence of a catalyst generally referred to as a Ziegler-Natta catalyst. These catalysts generally consist of materials such as a titanium trihalide and organometallic co-catalysts such as aluminum alkyls or alkyl halides (represented by aluminum sesquihalide and diethyl aluminum halide).

There has been a considerable amount of work on modified Ziegler-Natta polymerizations, with development of more efficient promoters for the production of highly crystalline polypropylene and poly(butene-1). These research efforts, usually have been twofold: to maximize catalyst activity and to control polymer stereospecificity. Among the numerous organic additives proposed for the preparation of polypropylene and poly(butene-1) were disclosed at length in U.S. Pat. No. 3,476,730, hereby incorporated by reference in its entirety into the instant specification.

This basic catalyst system has been modified in many ways including a three component olefin polymerization catalyst containing alkyl aluminum sesquihalide and transition metal compounds such as disclosed in U.S. Pat. No. 2,951,066. The catalyst comprises a mixture of an alkyl phosphine compound. The invention was designed to provide a method for the polymerization of alpha-monoolefins to yield high molecular weight crystalline polymers such as high density polyethylene. These polymers are taught to be insoluble in solvents at ordinary temperatures, be highly crystalline and be suitable for molded objects exhibiting a high degree of stiffness. The process provides for a temperature range of from 0° C. to 250° C. and reaction pressures from atmospheric to about 20,000 pounds per square inch gauge (psig).

U.S. Pat. No. 3,004,015 relates to an improved polymerization method using a stibine compound of the formula $SbR_3$ used as a modifier in the polymerization of alpha-olefins, stibine replacing phosphorus in the process. However, both these materials are Group VA elements.

U.S. Pat. No. 3,081,287 utilizes a mono-substituted aluminum dihalide of the formula $RAlX_2$ together with a transition metal and triphenylphosphine. The catalyst system is similar to that described in U.S. Pat. No. 2,951,066 which uses a mono-substituted aluminum dihalide instead of alkyl aluminum sesquihalide. The substitution, however, was not predictable since it is known that the activity of certain catalyst combinations are highly unpredictable and relatively minor changes in catalyst combinations can lead to liquid polymers rather than solid polymers.

U.S. Pat. No. 3,294,427 teaches a polymerization of alpha-olefins using a mixture of aluminum dihalides, transition metals such as titanium trichloride and a material from Group VA having the formula $R_3Z$, represented by triphenylphosphine or triphenyl stibine.

British 1,000,348 uses as third component in a Ziegler-Natta system an organic compound containing hydrogen and one atom from the group consisting of phosphorus arsenic, and antimony directly bonded to one atom of the group consisting of phosphorus, arsenic, antimony, oxygen, sulfur, nitrogen and halogens. Provided that when the atom from the first group is phosphorus, the atom from the second group is not oxygen. It should be noted that triphenylphosphine does not meet this requirement since it is an organic compound containing hydrogen and phosphorus bonded to a carbon atom.

U.S. Pat. No. 3,977,997 provides a process for the manufacture of a modified titanium-containing catalyst for the polymerization of alpha-olefins of 3-6 carbon atoms. This patent teaches the use of a phosphorus-containing compound and teaches that propylene and butylene can be polymerized in the presence of a mixture of titanium and aluminum trichloride, triphenylphosphine, tributylphosphine, etc. to yield an alpha-olefin polymer.

German Offenlegungsschrift No. 2,441,541 teaches ball-milling titanium trichloride and a minor amount of aluminum trichloride with phosphine oxide or phosphite or phosphate ester or amide. U.S. Pat. No. 3,992,320 teaches the use of a catalyst for the manufacture of polypropylene by pulverizing titanium trichloride in ⅓ mole aluminum trichloride with tributylphosphine in the presence of a finely divided polymer.

In addition, a number of ether modified Ziegler-Natta systems have been proposed as catalysts. A propylene polymerization catalyst was taught in U.S. Pat. No. 3,116,274 consisting of an aluminum alkyl, a titanium halide such as titanium tetrachloride, and an ether compound. They recommended the use of a halogen-free alkyl as the co-catalyst for the propylene polymerization process and cyclic ethers such as 1,4-dioxane were suitable as catalyst promoters. The disclosed catalyst system considerably reduced the formation of oily polymers when compared to a system without an ether component.

In U.S. Pat. No. 3,206,523, synthetic lubricants were prepared by the polymerization of $C_{6-14}\alpha$-olefins in the presence of an aluminum alkyl sesquichloride, titanium tetrachloride and an oxygen containing organic components such as an oxirane or a methyl alkyl ether at 0°–50° C.

In U.S. Pat. No. 3,156,681, an improved process for the polymerization of olefins was revealed employing an unsaturated ether compound as a catalyst promoter. Suitable unsaturated ethers were vinyl ethers and the preferred compound was vinyl isobutyl ether. Optional components to the modified system were taught, such as alkyl ethers, aliphatic and aromatic amines, and tertiary phosphines.

In U.S. Pat. No. 3,318,859 a process for the stereospecific polymerization of propylene by a catalyst prepared from a monoalkyl aluminum halide, violet titanium trichloride and an ether of the formula $R_1OR_2$, where $R_1$ represents alkyl or aralkyl and $R_2$ is an alkyl, aryl, aralkyl or alkaryl radical. The aim of the patent specification was the preparation of isotactic polypropylene.

However, none of these references, whether taken alone or in combination, teach or suggest a method for obtaining an ultrahigh molecular weight polymer with properties suitable for use as a drag reducing agent. These references are representative but not exhaustive of the art.

It would therefore be of great benefit to provide a method and catalyst for an improved polymerization catalyst system for $C_2$–$C_{30}$ alpha-olefinic hydrocarbons which will provide ultrahigh molecular weight polymers having a high polymerization efficiency and suitable for use as a drag reducing agent.

While it is recognized that ethylene is not per se an alpha-olefin, ethylene will be classified as such for comment throughout this specification since ethylene can be present in amounts generally below about 10% by weight.

It is therefore an object of the present invention to provide an improved process and polymerization catalyst for alpha-olefinic hydrocarbons which will produce ultrahigh molecular weight polymers by utilizing a catalyst having a high activity or efficiency.

It has now been found in accordance with the instant invention that ultrahigh molecular weight noncrystalline, hydrocarbon-soluble polymers can be obtained from a process comprising:
  (1) titanium halide of the general formula $TiX_m$ wherein m is from 2.5 to 4.0 and X is a halogen;
  (2) a cocatalyst such as an organo-aluminum or organo-aluminum halide of the general formula $AlR_nX_{3-n}$ where R is a hydrocarbon radical, X is a halogen and n is 2 or 3; and
  (3) a monoether compound of the formula $R_1OR_2$, wherein $R_1$ and $R_2$ are, independently, aryl, alkyl, cycloalkyl, aralkyl or alkaryl, each containing from 1 to 20 carbon atoms and placing the catalyst in contact with;
  (b) $C_2$–$C_{30}$ α-monoolefinic hydrocarbons under temperature conditions suitable to form high molecular weight polymers, then
  (c) ceasing polymerization at a polymer content level of 20% by weight or less, based on the total reaction mixture.

Steps (a) and (b) are generally carried out under inert, anhydrous atmosphere, atmospheric pressures, and temperatures of from about $-25°$ C. to about 80° C. Pressures can be either higher or lower than atmospheric, depending on the olefins used. Preferred temperatures are from about 10° C. to about 30° C.

A preferred method for preparing non-crystalline hydrocarbon soluble, ultrahigh molecular weight drag reducing polymers comprises
  (a) preparing under an inert atmosphere a catalyst comprising
    (1) titanium trichloride of the general formula $TiCl_3 \cdot nAlCl_3$ wherein n is from 0.00 to 0.50;
    (2) an organoaluminum compound of the general formula $AlR_nX_{3-n}$ wherein R is a hydrocarbon radical containing from 1 to 20 carbon atoms X is a hydrogen atom or halogen atom, and n varies from 2 to 3;
    (3) a monoether compound of the formula $R_1OR_2$ wherein $R_1$ and $R_2$ are, independently, aryl, alkyl, cycloalkyl, aralkyl, or alkaryl, each containing from 1 to 20 carbon atoms and placing the catalyst in contact with
  (b) $C_2$ to $C_{30}$ alpha-monoolefinic hydrocarbons at temperatures of from about $-10°$ C. to about 40° C.; then
  (c) ceasing polymerization at a polymer content level of 20% by weight or less based on the total reaction mixture.

Thus, according to the instant invention, an aluminum alkyl or a dialkyl aluminum halide is preferred as a co-catalyst for the titanium trichloride, monoether polymerization of an alpha-olefin. The resulting polymer mixture prepared in accordance with the instant invention can be used as a drag reducing substance or an anti-mist agent. The resulting polymers produced are hydrocarbon soluble and of ultrahigh molecular weight, yet are not suitable to form molded objects, and cannot be suitably extruded or injection molded into solid articles.

The instant invention provides for the manufacture of a mixture containing an ultrahigh molecular weight non-crystalline polymer in a hydrocarbon solvent. However, the polymer can be manfactured in an olefin with no additional solvent. The entire mixture can then be used as a drag reducing substance for pumpable liquids or an anti-mist agent for volatile liquids. Catalyst residues and solvents can be removed from the polymer by means of precipitation or washing by means well-known in the art. However, for use as a drag reducing agent or anti-mist agent, such steps would not normally be carried out since the recovery of raw materials is difficult and additional processing steps are required with resulting economic loss.

The instant invention provides the most favorable method for preparing a drag reducing polymer or anti-mist agent since the polyolefin is produced in a hydrocarbon solvent and the entire mixture containing polyolefin, solvent, and catalyst particles can be used, thus allowing great economic efficiency. No separation is required.

Thus, the instant invention relates to a catalyst and a method for the polymerization of $C_2$–$C_{30}$ alpha-monoolefins, particularly relating to a method for preparing an ultrahigh molecular weight non-crystalline polymer which is hydrocarbon soluble and an effective drag reducing substance for liquids. As discussed, catalyst systems which employ a mixture of titanium trichloride and aluminum chloride with a composition of $TiCl_3 \cdot 1/3AlCl_3$ are well known. Attempts have been made to further increase polymerization activity by the introduction of various inorganic and organic materials to these basic systems. These systems are generally employed toward the preparation of highly crystalline high molecular weight poly alpha-olefins such as polypropylene, poly(butene-1), and poly(4-methyl-1-pentene) which have little or no solubility in hydrocarbons. These highly crystalline polymers are the result of the orderly arrangement of the pendent substituents along the polymer chain backbone. These stereoregular crystalline polymers have excellent physical and mechanical properties. However, ultrahigh molecular weight polyethylene, polypropylene, or poly(butene-1) polymers and co-polymers render the material difficult to process and methods have been introduced to control molecular weight. For example, polymer chain length of an alpha-olefin polymer may be reduced by carrying out the polymerization under an atmosphere of hydrogen.

Thus, a large number of catalyst systems are known for the polymerization of alpha-olefins. However, the same catalysts and polymer processes provide a polymer which is not suitable for drag reducing purposes.

U.S. Pat. No. 3,692,675 teaches a method for reducing friction loss or drag for pumpable fluids through pipelines by adding a minor amount of a very high molecular weight polymer. Amounts of from about 5 to about 500 parts per million of poly alpha-olefins in the pumpable fluid provides drag reduction. The percent drag reduction for oil being transported through a pipeline was defined in this patent as Percent Drag Reduction =

$$\frac{(\text{Pressure drop of oil}) - (\text{Pressure drop of polymer solution})}{(\text{Pressure drop of oil})} \times 100$$

Polymers prepared from $C_8$ to $C_{10}$ alpha-mono-olefins were the most effective studied. It was further demonstrated that higher molecular weight polymers as measured by the accepted criteria of the polymers inherent viscosity were more effective than polymers possessing low inherent viscosities and lower molecular weight.

I have also unexpectedly found that certain organic and inorganic modifiers provide a catalyst system having excellent polymerization and activity in the ability to produce an ultrahigh molecular weight polymer when the polymerization is carried out under the appropriate reaction parameters herein disclosed. The polymerization conditions are very important in controlling molecular weight and catalyst activity. For example, increasing temperatures will result in a more active transition metal catalyst thereby producing more polymer per gram of catalyst used per hour, but will decrease the average molecular weight of the resulting polymer, producing either a less effective drag reducing substance or a totally inactive drag reducing polymer.

In contrast, lowering the temperature below the $-25°$ C. requirement will produce an ultrahigh molecular weight product at the expense of catalyst activity. The low polymerization rate is not effective in an industrial operation. In addition, increased energy is needed to lower the reaction temperature, thus adding costs to the operation. It is thus more economical to produce a polymer at or near room temperature.

When a basic Ziegler-Natta catalyst system consisting of titanium trichloride and diethylaluminum chloride was used for the polymerizing of octene-1, a high average molecular weight polymer is produced as measured by the accepted criteria of inherent viscosity ($\eta$inh).

Several types of titanium trichloride are available commercially, most sold by Stauffer Chemical Company, USA. Most are prepared by the reaction of titanium tetrachloride with aluminum. The well-known type 1.1 catalyst is titanium trichloride containing approximately $\frac{1}{3}$ mole of aluminum trichloride per mole of titanium chloride. Type 1.13 includes further additives and produces higher active catalysts for propylene polymerization as well as a polymer of higher tacticity. U.S. Pat. No. 4,124,530 teaches a method for preparing a titanium catalyst by freshly reducing titanium tetrachloride with aluminum and adding a small amount of monocyclic terpenic ketones or bicyclic terpenic ketones. An inorganic compound can be added to further activate the catalyst.

When a titanium trichloride catalyst containing monocyclic terpenic ketones and bicyclic terpenic ketones was used in place of a catalyst not containing these additives under the same conditions, the rate of polymerization increased, but the average molecular weight of the product severely decreased as well as its drag reducing ability. It is known in the art that low molecular weight alpha-olefin polymers are not effective drag reducing substances when added to crude oil being transported in pipelines as taught in U.S. Pat. No. 3,692,676. Drag reduction increases with a polyolefin having increased average molecular weight. Alpha-olefinic polymers prepared from $C_8$ to $C_{10}$ alpha-olefins gave best results. The addition of a small amount of ultrahigh molecular weight poly(octene-1) to hydrocarbons being pumped showed a drag reduction ranging from 30 to 50%.

Therefore, an improved catalyst of the instant invention is comprised of
(a) a crystalline titanium trichloride prepared by a method selected from the group consisting of
(1) reducing titanium tetrachloride with a metal such as aluminum;
(2) reducing titanium tetrachloride with hydrogen;
(3) reducing titanium tetrachloride with an organometallic compound such as an aluminum alkyl, or
(4) by milling titanium trichloride with an aluminum trichloride together with
(b) 2.5 to 10 weight percent based on the weight of the titanium trichloride portion of the catalyst of an organic ketone, especially acyclic or cyclic saturated compounds such as saturated monocyclic or bicyclic monoterpenic ketones represented by menthone, carbomenthone, thujone, verbanone, verbenone, camphor or fenchone, and
(c) a monoether compound of the formula $R_1OR_2$ where $R_1$ and $R_2$ are, independently, aryl, alkyl, aralkyl, or alkaryl containing up to 12 carbon atoms each and
(d) 0 to 1.0 weight percent based on the total weight of the titanium trichloride component of an ionic or polar compound such as Group IA of IIA metal halides (such as: sodium bromide, potassium bromide, sodium chloride, sodium iodide), transition metals, aliphatic triacid salts, quaternary ammonium halide or sulfate salts, alkaline earth metal phosphates and alkyl alkali metal sulfates.

Particularly preferred are the stearate salts of copper and zinc, quaternary ammonium salts, especially the trialkyl chlorides, hydrobromides, and hydroiodides, preferably the $C_1$–$C_4$ trialkyl compounds thereof. Examples of suitable compounds are triethylamine hydrochloride, the salts of aliphatic triacids such as 2-hydroxy-1,2,3-propanetricarboxylic acid, citric acid, calcium citrate, ferric ammonium citrate, and alkyl alkali metal sulfates such as dodecyl sodium sulfate.

The aluminum alkyl portion of the catalyst of the instant invention is an alkyl aluminum halide having the general formula $AlR_nX_{3-n}$ where R is a hydrocarbon radical containing 1 to 20 carbon atoms such as aryl, alkyl, aralkyl, cycloalkyl, or alkaryl, X is a hydrogen atom and/or halogen atom, and n varies from 2 to 3. Representative examples of such organoaluminum compounds which can be used alone or in combination are trimethylaluminum, triethylaluminum, tri-n-propylaluminum, tri-n-butylaluminum, triisobutylaluminum, tri-n-hexylaluminum, tri(2-methylpentyl)aluminum, tri-n-octylaluminum, deithylaluminum hydride, diisobutylaluminum hydrides, diisopropylaluminum chloride, dimethylaluminum chloride, diethylaluminum chloride, diethylaluminum bromide, diethylaluminum iodide, di-n-propylaluminum chloride, di-n-butylaluminum chloride, diisobutylaluminum chloride, or mixtures of these. Other organo-aluminum compounds can, of course, be used as the co-catalyst.

The ether catalyst modifier is a mono-ether compound having the general formula $R_1OR_2$ wherein $R_1$ and $R_2$ are, independently, aryl, alkyl, cycloalkyl, aralkyl, or alkaryl containing from 1 to 20 carbon atoms. Representative examples of such ethers are:

Alkyl ethers
    benzyl ether
    n-butyl ether
    tert-butyl methyl ether
    diethyl ether
    isopropyl ether
    n-propyl ether Aryl ethers
    m-phenoxyl toluene
    phenyl ether Aralkyl ethers
    anisole
    butyl phenyl ether
    2,3-dimethylanisole
    2,4-dimethylanisole
    2,5-dimethylanisole
    2,6-dimethylanisole
    3,5-dimethylanisole
    1-ethoxynaphthalene
    1-methoxynaphthalene
    2-methoxynaphthalene Cyclic ethers
    1,4-benzodioxan
    2,3-benzofuran
    cyclododecane epoxide
    cyclohexane oxide
    cyclooctene oxide
    cyclopentene oxide
    2,5-dimethylfuran
    2,5-dimethyltetrahydrofuran
    p-dioxane
    1,2-epoxybutane
    furan
    2-methylfuran
    2-methyl tetrahydrofuran
    3-methyl tetrahydrofuran
    styrene oxide
    tetrahydrofuran
    tetrahydropyran Representative but non-exhaustive examples of Alkyl Ketones are:
    acetone
    benzylacetone
    2-butanone
    di-n-hexyl ketone
    2,6-dimethyl-3-heptanone
    2,6-dimethyl-4-heptanone
    3,5-dimethyl-4-heptanone
    2,4-dimethyl-3-pentanone
    4,4-dimethyl-2-pentanone
    1,1-diphenylacetone
    1,3-diphenylacetone
    9-heptadecanone
    2-heptanone
    3-heptanone
    4-heptanone
    2-hexanone
    3-hexanone
    2-methyl-3-hexanone
    5-methyl-2-hexanone Alkyl-Ketones (cont.)
    3-methyl-2-pentanone
    4methyl-2-pentanone
    10-nonadecanone
    2-nonanone
    5-nonanone
    2-octanone
    3-octanone
    4-octanone
    8-pentadecanone
    2-pentanone
    3-pentanone
    phenylacetone
    1-phenyl-2-butanone
    2-undecanone
    6-undecanone Aryl Ketones
    benzophenone
    4-benzyolbiphenyl
    2-methylbenzophenone
    4-methylbenzophenone Aralkyl Ketones
    4-acetylbiphenyl
    2-acetylfluorene
    2-acetylphenanthrene
    3-acetylphenanthrene
    9-acetylphenanthrene
    deoxybenzoin
    hexanophenone
    o-methylacetophenone
    m-methylacetophenone
    p-methylacetophenone
    propiophenone
    undecanophenone
    valerophenone Carbocylic Ketones
    2-adamantanone
    anthrone
    benzathrone
    bicyclo[3.3.1]nonan-9-one
    bicyclo[3.2.1]octan-2-one
    4-tert.-butylcyclohexanone
    (+)-camphor
    dl-camphor
    (−)-camphor
    carone
    carbomenthone
    cyclobutanone
    cyclodecanone
    cyclododecanone
    cycloheptanone
    cyclohexanone
    cyclononanone
    cyclooctanone
    cyclopentadecanone
    cyclopentanone
    cycloundecanone
    2,5-dimethylcyclopentanone
    4-ethylcyclohexanone
    fenchone
    9-fluorenone
    1-indanone
    2-indanone
    menthone 2-methylcyclohexanone
(+)-3-methylcyclohexanone
3-methylcyclohexanone
(+)-3-methylcyclopentanone
dl-3-methylcyclopentanone
1-methyl-2-decalone
1-methyl-2-tetralone
2-methyl-1-tetralone
4-methyl-1-tetralone
norcamphor
α-tetralone
β-tetralone
3,3,5,5-tetramethylcyclohexanone
thujone
2,2,6-trimethylcyclohexanone
verbanone
verbenone The mole ratio of the three components of the catalyst system of the instant invention will depend upon the specific end result desired. However, generally a mole ratio of aluminum to ether to titanium will range from about 1/0.01/1 to about 15/5/5, respectively. A mole ratio of 3/0.5/1.0 is preferred. Desirable results can be achieved when the mole ratio of the ether component to the aluminum alkyl component is within the range of 0.01 to 1.0. The catalyst mixture is simply prepared by mixing the three components. No extensive milling or complicated combination is necessary.

Thus, the instant invention also discloses a catalyst for the polymerization of α-olefins containing from 2 to 30 carbon atoms, comprising,
  (a) titanium trichloride of the general formula $TiCl_3 \cdot nAlCl_3$ wherein n is from 0.00 to 0.50, prepared by a method selected from the group consisting of;
    (1) reducing titanium tetrachloride with aluminum,
    (2) reducing titanium tetrachloride with hydrogen,
    (3) reducing titanium tetrachloride with an organometallic compound, or
    (4) milling a titanium trichloride with the salt of a Group III metal, preferably aluminum in conjunction with
  (b) a saturated acyclic or cyclic ketone, especially a saturated monocyclic monoterpenic ketone or a bicyclic monoterpenic ketone,
  (c) a compound selected from the group consisting of ionic compounds and polar compounds comprising Group IA or IIA metal halides, transition metals, aliphatic triacid salts, quaternary ammonium halide or sulfate salts, alkaline earth phosphates and alkyl alkali metal sulfates,
  (d) an organo-aluminum halide of the formula $AlR_nX_{3-n}$ where R is a hydrocarbon radical containing from 1 to 20 carbon atoms, X is halogen and n is 2 or 3, and a
  (e) catalyst modifier of the formula $R_1OR_2$ wherein $R_1$ and $R_2$ are, independently, aryl, alkyl, aralkyl, cycloalkyl or alkaryl containing up to 20 carbon atoms The polymerization of the alpha monoolefins can be carried out in a non-solvent system; that is, the liquid monomers themselves can be utilized as a solvent. However, the polymerization can also be carried out in an inactive hydrocarbon solvent such as branched or straight chained aliphatic compounds. Representative examples of such compounds are pentane, hexane, heptane or octane. Alicyclic hydrocarbon substances can also be used. Representative examples of such substances are benzene, toluene, and xylene. Analogues of the above hydrocarbons or their mixtures can be used; for example, LPA solvent (low polynuclear aromatic solvent, a very high purity aliphatic hydrocarbon having a molecular weight very similar to kerosene with a low aromatic and olefin content, sold by Conoco Inc.).

The catalyst should be handled under an inert atmosphere during preparation and polymerization in order to minimize deterioration. Representative examples of suitable inert atmospheres are nitrogen, xenon, and argon.

A wide range of polymerization conditions can be utilized in the process of the instant invention. Generally, the polymerization will be carried out at pressures from atmospheric to about 1,000 psig but atmospheres from 1 to 25 atmospheres are preferred. The polymerization temperature generally will range from about −25° C. to about 80° C., but preferred temperatures are from about −10° to about 40° C. Increasing the temperature will result in an increase in catalytic rate, but will decrease the average molecular weight of the polymer which is not desired when drag reducing agents are being prepared. The polymerization can be carried out either by batch or continuous methods. The polymerization is terminated by conventional methods used for the deactivation of Ziegler-Natta catalysts. For example, the polymerization can be halted by the addition of a small amount of alcohol while the polymerization mixture is under an inert atmosphere.

It is essential that the polymerization reaction be terminated at 20 weight percent or less polymer content in order to obtain a non-crystalline hydrocarbon ultrahigh molecular weight soluble polyolefin. The resulting mixture will then contain less than 20 weight percent of the ultrahigh molecular weight polyolefin, a hydrocarbon solvent (or unreacted olefins), deactivated catalysts, and a small amount of alcohols. The entire mixture can be used as a drag reducing substance. The polymer can be precipitated by a variety of techniques if desired. These techniques are well-known to those skilled in this art.

The solid polymer can be added to pipelines or hydrocarbons. However, for use as a drag reducing agent or anti-mist agent, such steps would not normally be carried out since the recovery of raw materials is difficult and additional processing steps are required with resulting economic loss.

In addition, materials can be added to prevent deterioration of the mixture or corrosion of its environment. For example, materials such as epoxides (propylene oxide) or compounds containing at least one oxirane unit; primary secondary and tertiary amines (such as triethylamine, tributylamine, trioctylamine); polyamines, natural amino compounds (such as coco-propylene diamine) and Group IA and IIA metal hydroxide bases and butylated hydroxy toluene. In addition, corrosion inhibitors such as propargyl alcohol or commercial film forming material (such as INHIBITOR 98, trademark of and sold by Sherwin-Williams Company) can be used.

It is essential that the polymerization be terminated at 20% less of polymer content based on the total reaction system in order to maintain the ultrahigh molecular weight desired. As the polymerization continues to higher levels, the average molecular weight will rapidly decrease, making the materials unsuitable for use as drag reducing agents.

Furthermore, as the polymerization continues to higher levels, the bulk viscosity of the medium increases making the material difficult to pump, transfer or meter into a pipeline.

It is preferred in the practice of the instant invention to cease polymerization at polymer content levels ranging from about 5 to 20 weight percent. However, polymer content levels from 5 to 15 weight percent are preferred and polymer content levels of from 10 to 12% are most preferred, all based on the total reaction system by weight.

The invention is more concretely described with reference to the examples below wherein all parts and percentages are by weight, and are based on the total reaction mixtue, unless otherwise specified. The examples are provided to illustrate the instant invention and not to limit it.

Examples 1 through 6 show the polymerization method of the instant invention compared to previous methods.

EXAMPLES 1-6

Dried deoxygenated LPA as a solvent was placed into a clean, dry 1 quart pressure vessel. Diethylaluminum chloride (DEAC) was followed by the addition of di-n-butyl ether ($Bu_2O$). The titanium catalyst of the Stauffer type 1.1 was added under an inert atmosphere of dry argon. The resulting mixture was placed into an agitated water bath and the catalyst components were allowed to interact for 30 minutes while stirring at 290 revolutions per minute (rpm). Polymerizations were initiated by the addition of the monomer, octene-1, and were terminated by adding 1.7 milliliters of isopropyl alcohol to deactivate the catalyst. The polymer mixture was stabilized using butylated hydroxytoluene (BHT) as an anti-oxidant and propylene oxide to scavenge hydrochloric acid formed. For purposes of comparison, a catalyst system was prepared under identical conditions except n-butyl ether was not used. Table 1 shows comparative data and results obtained from these experiments. In the table, $TiCl_3(AA)$ is equated to $TiCl_3 . 1/3AlCl_3$. The catalyst used was aluminum activated titanium chloride, Stauffer Chemical Company type 1.1.

TABLE 1
Effect Of N—Butyl Ether As A Modifier For The DEAC-$TiCl_3$(1.1) Polymerization of Octene-1

| Example | mmol n-$Bu_2O$ Added per mmol $TiCl_3$ | Reaction Time (Hours) | Weight % Polymer | Catalyst Activity | $\eta$inh by the Single-Bulb Method |
|---|---|---|---|---|---|
| 1 | 0.00 | 5.1 | 9.37 | 109 | 6.98 |
| 2 | 0.10 | 4.6 | 10.13 | 130 | 8.00 |
| 3 | 0.25 | 3.7 | 10.51 | 168 | 8.14 |
| 4 | 0.50 | 3.2 | 10.71 | 198 | 8.28 |
| 5 | 0.75 | 1.8 | 9.58 | 319 | 7.89 |
| 6 | 1.00 | 1.5 | 9.48 | 375 | 7.68 |

The catalyst activity in Table 1 is expressed as grams of poly(octene-1) produced per gram of titanium used per hour in LPA solvent at a bath temperature of $25 \pm 1°$ C., using a 15% monomer charge by weight. The polymerization ratio was 375/3/1 (millimoles of octene-1/DEAC/$TiCl_3$.AA). $\eta$inh is the inherent viscosity at 25° C. in a Cannon-Fenske single bulb viscometer (0.1 g polymer/100 ml LPA solvent at 25° C.).

In determining weight percent of polymer produced, 75 grams of each deactivated polymer mixture was placed into 400 ml of isopropanol with sufficient mixing to precipitate a viscous material containing poly(octene-1). The substance was washed with an additional 400 ml of isopropanol, filtered and washed with 400 ml of methanol to remove catalyst residues. The poly(octene-1) was collected by vacuum filtration and dried in a vacuum oven overnight.

In Examples 7 through 11, a variety of ethers were used as catalyst modifiers exactly as described in Example 1 for the polymerization of octene-1. In the data shown in Table 2 the catalyst millimole ratio was 3/0.25/1 (aluminum/ether/titanium).

Various Ether Catalyst Modifiers For Octene-1 Polymerization

| Example | Ether | Reaction Time (Hours) | Weight % Polymer | Catalyst Activity | $\eta$inh by the Single-Bulb Method |
|---|---|---|---|---|---|
| 7 | benzyl ether | 1.3 | 4.18 | 239 | 8.85 |
| 8 | n-propyl ether | 1.2 | 4.20 | 202 | 9.56 |
| 9 | isopropyl ether | 1.6 | 5.37 | 201 | 8.89 |
| 10 | methyl tert-butyl ether | 1.2 | 2.79 | 136 | 8.84 |
| 11 | diethyl ether | 1.1 | 3.49 | 192 | 8.56 |

EXAMPLES 12-22

In these examples, dried deoxygenated LPA as a solvent was placed into a clean and dry 1 quart pressure vessel. Diethylaluminum chloride (DEAC) was added followed by the addition of di-n-butyl ether ($Bu_2O$). The titanium trichloride catalysts were obtained from Stauffer Chemical Company (USA) at Type 1.1 material containing approximately one-third mole equivalent aluminum trichloride per equivalent of titanium and prepared by the reduction of titanium tetrachloride with aluminum metal. The mixture is further activated by ball-milling the two components. The Type 1.13 material, also obtainable from Stauffer Chemical Co., also contains $TiCl_3$. 0.33$AlCl_3$, but contains camphor as a catalyst modifier. Both types of titanium trichloride were added to the vessel under an inert atmosphere of dry argon. The resulting mixture was placed into an agitated water bath and the catalyst components were allowed to interact for 30 minutes at 290 revolutions per minute (rpm) followed by the addition of the monomer, octene-1, to the vessel at $25 \pm 1°$ C. the polymerization reactions were terminated using 1.7 milliliters of isopropyl alcohol to deactivate the catalyst. The mixture was stabilized using butyl hydroxy toluene (BHT) as an antioxidant and propylene oxide to scavenge HCl formed. For purposes of comparison a catalyst system was prepared under identical conditions except n-butyl ether ($Bu_2O$) was not used. Comparative data and results are presented in Table 3. In the table, diethylaluminum chloride is abbreviated DEAC, $TiCl_3$(AA) is equaled to $TiCl_3.1/3AlCl_3$. The catalyst used was aluminum activated titanium trichloride from the Stauffer Chemical Company of the type 1.1 and of the type 1.13. The catalyst activity is expressed in grams of poly(octene-1) produced per gram of titanium used per hour in LPA as a solvent at a bath temperature of $25 \pm 1°$ C. using approximately a 15% monomer charge having a catalyst ratio of 375/3/1 (millimoles of octene-1/DEAC/$TiCl_3$.AA); and $\eta$inh is the inherent viscosity in LPA as a solvent.

To determine the weight percent of polymer produced, 75 grams of each deactivated polymer mixture was poured into 400 ml of isopropanol with sufficient mixing to precipitate a viscous material containing poly(octene-1). The substance was washed with an additional 400 ml of isopropanol, filtered, and washed with 400 ml of methanol to remove catalyst residue. The poly(octene-1) was collected by vacuum filtration and dried in a vacuum oven overnight.

TABLE 3
EFFECT OF N—BUTYL ETHER AS A MODIFIER

| Example | TiCl$_3$ (AA) | mol n-Bu$_2$O Added per mmol TiCl$_3$ | Reaction Time (Hours) | Weight % Polymer | Catalyst Activity | Single Bulb $\eta$inh |
|---|---|---|---|---|---|---|
| 12 | Type 1.1 | 0.00 | 4.3 | 8.05 | 112 | 7.41 |
| 13 | Type 1.13 | 0.00 | 3.0 | 8.52 | 167 | 6.61 |
| 14 | Type 1.13 | 0.00 | 3.8 | 9.84 | 152 | 6.13 |
| 15 | Type 1.13 | 0.00 | 3.7 | 9.41 | 151 | 6.02 |
| 16 | Type 1.13 | 0.10 | 1.1 | 4.80 | 254 | 7.17 |
| 17 | Type 1.13 | 0.25 | 0.93 | 4.74 | 301 | 8.99 |
| 18 | Type 1.13 | 0.25 | 2.1 | 10.53 | 300 | 7.69 |
| 19 | Type 1.13 | 0.50 | 0.78 | 4.92 | 373 | 8.89 |
| 20 | Type 1.13 | 0.75 | 0.62 | 3.17 | 305 | 8.97 |
| 21 | Type 1.13 | 1.00 | 0.42 | 4.67 | 663 | 8.22 |
| 22 | Type 1.13 | 1.00 | 0.90 | 9.22 | 588 | 7.37 |

Table 3 shows that Type 1.13 catalyst with DEAC is more active, producing more polymer per gram of titanium used per hour, than the Type 1.1 catalyst for the solution polymerization of octene-1 in LPA at 25±1° C. It also shows that the inherent viscosity ($\eta$inh), a measure of the polymer's average molecular weight, of the poly(octene-1) produced with the Type 1.13 system is lower than that of the Type 1.1 system, and unacceptable. The broad object of the invention is to provide non-crystalline hydrocarbon soluble ultrahigh molecular weight polymers, since these materials provide more effective drag reducing substances. The twin goals of having high activity and ultrahigh molecular weight are achieved by the addition of the effective quantity of ether to the Type 1.13 system.

These goals are achieved using modified Ziegler-Natta catalysts, where titanium is in a valence less than maximum and the modification is accomplished by adding (1) a cyclic or acylic ketone of the general formula

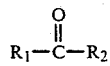

$$R_1-\overset{\overset{\displaystyle O}{\|}}{C}-R_2$$

wherein $R_1$ and $R_2$ are, independently, aryl, alkyl, cycloalkyl, alkaryl and aralkyl, each containing from 1 to 20 carbon atoms, and wherein $R_1$ and $R_2$ can be joined through a covalent bond, and (2) a monether of the formula $R_1OR_2$ wherein $R_1$ and $R_2$ are, independently, aryl, alkyl, aralkyl, cycloalkyl, or alkaryl, each containing from 1 to 12 carbon atoms and $R_1$ and $R_2$ can be joined through a covalent bond.

Such catalysts have a synergistic effect with regard to catalyst activity and molecular weight as determined by inherent viscosity. This synergism is seen by comparing a basic catalyst (Example 1) with an ether-modified catalyst (Example 4) and a ketone-modified catalyst (Example 13). While each additive shows some improvement in catalyst activity and inherent viscosity, an extremely high level of activity and viscosity are reached by combining the additives (Example 19).

Both the ether and ketone compounds are added to the catalyst in effective amounts. Normally such amounts are from about 2.5 to about 10% by weight of the ketone, based on the total catalyst weight. The ether compound varies from about 0.01 to about 5 mole ratio, based on the aluminum component.

EXAMPLES 23-28

Dried deoxygenated LPA as a solvent was placed into a clean, dry 1 quart pressure vessel. Either aluminum sesquichloride (EASC) or diethylaluminum chloride (DEAC) was added, followed by the addition of the titanium catalyst. The promotor, either propylene oxide or n-butyl ether, was added under an inert atmosphere of dry argon. The resulting catalyst mixture was placed into an agitated water bath at 25±1° C. and the components were allowed to interact for approximately 45 minutes while stirring at 290 revolutions per minute (rpm). Polymerizations were initiated by the addition of the monomer, octene-1, and were terminated by adding 1.7 milliliters of methyl alcohol to deactivate the catalyst. The polymer mixture was stabilized using butylated hydroxy toluene (BHT) as an anti-oxidant. Table 4 shows comparative data (Examples 23 and 26) and results (Examples 27 and 28) obtained from these experiments. In the table, TiCl$_3$.AA is equated to TiCl$_3$.$\frac{1}{3}$AlCl$_3$. The catalyst used in examples 27 and 28, exemplifying the instant invention, was aluminum activated titanium chloride, from the Stauffer Chemical Company of the Type 1.1. EASC refers to the aluminum alkyl co-catalyst, ethyl aluminum sesquichloride, and DEAC refers to diethylaluminum chloride. The liquid TiCl$_4$ was obtained from the Alfa-Ventron Corporation of Danvers, Mass. The material was handled at all times in an inert atmosphere of dry argon and delivered by means of a syringe to the polymerization vessel.

The catalyst activity in Table 4 is expressed as grams of poly(octene-1) produced per gram of titanium used per hour in LPA solvent at a bath temperature of 25±1° C. using a 15 wt.% monomer charge. The polymerization ratio in all experiments was 375/3/1 (millimoles of octene-1/Al/Ti).

In determining weight percent of polymer produced, 75 grams of each deactivated polymer mixture was placed into 400 ml of ispropanol with sufficient mixing in order to precipitate ultrahigh molecular weight poly(octene-1). The substance was washed with an additional 400 ml of isopropanol to remove catalyst residues. The poly(octene-1) was collected by vacuum filtration and dried in a vacuum oven overnight.

The results of the polymerizations so carried out are set forth in Table 4.

TABLE 4
EFFECT OF VARIOUS ETHER MODIFIED Z/N SYSTEMS FOR THE POLYMERIZATION OF OCTENE-1

| Example | Catalyst System | PROMOTER Ether Used | mmol/ mmol Ti | Polymerization Time (Hours) | Wt % Polymer | Catalyst Activity | $\eta$inh Single-Bulb Method |
|---|---|---|---|---|---|---|---|
| 23 | TiCl$_4$, EASC | propylene oxide | 1.00 | 48.5 | 0.000 | — | — |

TABLE 4-continued
EFFECT OF VARIOUS ETHER MODIFIED Z/N SYSTEMS FOR THE POLYMERIZATION OF OCTENE-1

| Example | Catalyst System | PROMOTER Ether Used | mmol/ mmol Ti | Polymerization Time (Hours) | Wt % Polymer | Catalyst Activity | $\eta_{inh}$ Single-Bulb Method |
|---|---|---|---|---|---|---|---|
| 24 | TiCl$_4$, DEAC | propylene oxide | 1.00 | 48.5 | 0.958 | 1.17 | 2.13 |
| 25 | TiCl$_4$, EASC | n-butyl ether | 1.00 | 48.5 | 0.000 | — | — |
| 26 | TiCl$_4$, DEAC | n-butyl ether | 1.00 | 48.5 | 1.060 | 1.29 | 2.69 |
| 27 | TiCl$_3$.AA, DEAC | none | 0.00 | 5.1 | 9.370 | 109.00 | 6.98 |
| 28 | TiCl$_3$.AA, DEAC | n-butyl ether | 1.00 | 1.5 | 9.480 | 375.00 | 7.68 |

EXAMPLES 29-34

Polymerizations of octene-1 were conducted at 40±1° C. bath temperature using an olefin charge of 39±0.5% by weight. Both conventional and ether modified catalysts were compared. Two polymerizations were terminated at 14% polymer content levels. The remaining four polymerizations were terminated at polymer levels greater than 25% by weight. Drag reduction measurements were obtained at 10 parts per million and 10 feet per second in a ⅜-inch pipe viscometer.

In carrying out the polymerizations, dry deoxygenated LPA (low polynuclear aromatic solvent) was placed into a clean dry 1 quart pressure vessel. Diethylaluminum chloride in heptane was added followed by the addition of an optional catalyst modifier. The transition metal catalyst, titanium trichloride of Stauffer Type 1.1, was then added. The mixture was then placed into a constant temperature bath and stirred at 200 revolutions per minute for about 30 minutes. A stream of octene-1 was added under an inert atmosphere to initiate polymerization. Polymerizations were halted by using isopropanol to deactivate the catalyst. The catalyst ratio was 3/0.5/1 (millimoles Al/ether/Ti).

The inherent viscosity $\eta_{inh}$ was determined for each polymer produced using a Cannon-Ubbelohde four bulb shear dilution viscometer (0.1 g polymer/100 ml LPA solvent at 25° C.). Inherent viscosities were calculated at shear rates of 300 sec$^{-1}$.

Drag reduction measurements were made in a ⅜-inch ID pipe viscometer at a flow rate of 10 feet per second, and diesel oil was used as a test fluid. In this test, diesel oil is continually circulated and flows from a 5-gallon storage tank through a Moyno progressive cavity pump into a 5-foot test section of ⅜-inch stainless precision tubing and returns to the 5-gallon tank. The storage tank is temperature controlled by Kryomat constant temperature controller. Temperature of the test sample was maintained at 74° F. and was continuously stirred at low speed in the tank.

The pressure drop differences are measured in percent drag reduction as calculated as $$\frac{\Delta P_{base} - \Delta P_{additive}}{\Delta P_{base}} \times 100$$

where $\Delta P_{base}$ is the initial base line pressure of diesel oil without the additive and $\Delta P_{additive}$ is the pressure drop with the polymer solution. Comparisons of these examples are set forth in Table 5.

TABLE 5
POLYMER CONTENT EFFECT ON DRAG REDUCTION

| Example | Modifier | Final Wt % Polymer | Catalytic Activity (gm/gm Ti.Hr) | Inherent Viscosity ($\gamma = 300$ sec$^{-1}$) | % DRAG REDUCTION AT 10 PPM and 10 FPS Initial | 1.0 Min. |
|---|---|---|---|---|---|---|
| 29 | None | 30.7 | 568 | 5.68 | 16.7 | 14.0 |
| 30 | Butyl Ether | 31.3 | 620 | 6.13 | 20.3 | 16.3 |
| 31 | None | 14.1 | 1066 | 6.50 | 24.2 | 20.4 |
| 32 | Butyl Ether | 14.0 | 952 | 7.72 | 27.0 | 22.4 |
| 33 | Butyl Ether | 27.2 | 1123 | 6.21 | 20.8 | 17.4 |
| 34 | Butyl Ether | 32.0 | 792 | 6.05 | 16.8 | 14.0 |

Samples of poly(octene-1) using a dibutyl ether modified system were compared with samples of a poly(octene-1) using a conventional catalyst system. After obtaining polymers, a portion of each sample was placed on an indented glass slide, pressed flat with a microscope slide, and held flat in a vise for 72 hours. The flattened samples were scanned with Cu K$\alpha$ radiation and the diffraction patterns recorded. All samples yielded a characteristic non-crystalline diffraction pattern similar to those obtained from liquids as described in X-ray Diffraction Patterns of Polymers, by J. W. Turley, the Dow Chemical Company, Midland, Mich., 1965. The patterns showed two broad maxima at approximately 14 and 4.6 angstroms which indicates that certain spacings within the polymers occur with a particularly high frequency.

EXAMPLE 35

A control sample was prepared by placing dried, deoxygenated low polynuclear aromatic (LPA) solvent into a clean dry 1 quart pressure vessel. Diethylaluminum chloride was added followed by the addition of titanium trichloride catalyst obtained from Stauffer Chemical Company (Type 1.1, TiCl$_3$.⅓AlCl$_3$). The materials were added under inert atmosphere of dry argon. The resulting mixture was placed into an agitated water bath and the catalyst components were allowed to interact for 30 minutes while stirring at 290 rpm. The polymerization was initiated by the addition of octene-1 (obtained from Ethyl Corporation). The polymerization was terminated 40 minutes later by the addition of 1.7 ml of isopropyl alcohol with mixing in order to deactivate the catalyst. The polymer mixture was stabilized using butylated hydroxy toluene (BHT) as an antioxidant. The polymerization was initially charged with 40% weight octene-1 and LPA as a polymerization diluent. The starting temperature was 20°±1° C. The ratio of polymerization compounds was 375/3/1 (millimoles of octene-1/diethylaluminum chloride/TiCl$_3$.AA).

In determining weight of polymer produced, 46 grams of deactivated polymer mixture was placed into a 400 ml of ispropanol with sufficient mixing to precipitate a viscous material containing poly(octene-1). The substance was washed with an additional 400 ml of isopropanol filtered and washed with 400 ml of methanol to remove catalyst residues. Poly(octene-1) was collected by vacuum filtration and dried in a vacuum oven overnight.

The procedure produced 6.75% polymer with an inherent viscosity of 10.28 deciliters per gram at a shear rate of 300 reciprocal seconds. An X-ray diffraction analysis showed a non-crystalline structure at room temperature.

A polymer of the present invention was prepared by placing dried deoxygenated LPA (450 ml) as a solvent into a clean dry 1-quart pressure vessel. Diethylaluminum chloride in the amount of 2.88 millimoles was added followed by the addition of di-n-butyl ether (0.48 millimoles). Titanium trichloride catalyst obtained from Stauffer Chemical Company (Type 1.1, 0.959 millimole) was added. The additions were conducted under an inert atmosphere of dry argon. The resulting mixture was placed into a shaker bath at a temperature of 23±1° C. The components were allowed to interact for 30 minutes while being agitated at 290 rpm.

Polymerization was initiated by the addition of 360 millimoles of octene-1. The olefin was polymerization grade monomer obtained from Ethyl Corporation. The monomer was deoxygenated with dry argon and dried over molecular sieves before using. The monomer was added under an inert atmosphere.

Polymerization was terminated after 4 hours and 49 minutes by adding 1.7 milliliters of isopropanol alcohol with sufficient mixing to deactivate the catalyst. The polymer mixture was stabilized using butylated hydroxy toluene as an antioxidant.

The weight percent polymer produced was determined by treating 75 grams of the deactivated polymer mixture with 400 ml of isopropanol with sufficient mixing to precipitate a viscous material containing poly(octene-1). The substance was washed with an additional 400 ml of isopropanol filtered and washed with 400 ml of methanol to remove catalyst residues. The poly(octene-1) was collected by vacuum filtration and dried in a vacuum oven overnight.

The method produced 2.40 percent polymer by weight with respect to the total polymerization mixture. The polymer had an inherent viscosity of 9.60 deciliters per gram using a single bulb capillary viscometer at 25° C. in LPA as a solvent, (0.1 gram of polymer per 100 ml of LPA). The solids produced were submitted for X-ray diffraction analysis. The analysis showed that a non-crystalline structure was obtained.

Thus, according to the instant invention, a catalyst comprising a specific type of titanium trichloride, an organoaluminum halide, a carbonyl compound and an ether compound is shown to produce polymer mixtures useful as drag reducing substances or antimist agents.

The resulting polymers are of ultrahigh molecular weight but are not suitable to form molded objects. The products of the instant invention cannot be suitably extruded to form pipe or tubing having rigid properties and cannot be injection molded. The present invention likewise shows a more efficient co-catalyst than alkylaluminum sesquihalide. This result is entirely unexpected in view of the other combination of these catalyst components and the results produced thereby.

While certain embodiments and details have been shown for the purpose of illustrating this invention, it will be apparent to those skilled in this art that various changes and modifications may be made herein without departing from the spirit or scope of the invention.

I claim:

1. An improved Ziegler/Natta catalyst for the polymerization of α-olefins containing from 2 to 30 carbon atoms, to form non-crystalline, hydrocarbon-soluble polymers said catalyst containing a titanium halide, wherein titanium has a valence less than maximum, and an organoaluminum compound, the improvement comprising modifying the catalyst by adding
   (1) cyclic or acyclic ketone(s) of the general formula

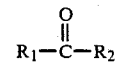

wherein R$_1$ and R$_2$ are, independently, aryl, alkyl, cycloalkyl, alkaryl, and aralkyl, each containing from 1 to 20 carbon atoms, and wherein R$_1$ and R$_2$ can be joined through a covalent bond, and
   (2) a monoether of the formula R$_3$OR$_4$ wherein R$_3$ and R$_4$ are, independently, aryl, alkyl, aralkyl, cycloalkyl, alkaryl, each containing from 1 to 20 carbon atoms.

2. A catalyst as described in claim 1 wherein the ether is selected from the group consisting of
benzyl ether
n-butyl ether
tert-butyl methyl ether
diethyl ether
isopropyl ether
n-propyl ether
m-phenoxyl toluene
phenyl ether
anisole
butyl phenyl ether
2,3-dimethylanisole
2,4-dimethylanisole
2,5-dimethylanisole
2,6-dimethylanisole
3,5-dimethyanisole
1-ethoxynaphthalene
1-methoxynaphthalene
2-methoxynaphthalene
1,4-benzodioxan
2,3-benzofuran
cyclododecane epoxide
cyclohexane oxide
cyclooctene oxide
cyclopentene oxide
2,5-dimethylfuran
2,5-dimethyltetrahydrofuran
p-dioxane
1,2-epoxybutane
furan 2-methylfuran
2-methyl tetrahydrofuran
3-methyl tetrahydrofuran
styrene oxide
tetrahydrofuran
tetrahydropyran.

3. A catalyst as described in claim 1 wherein the ketone is selected from the group consisting of
acetone
benzylacetone
2-butanone
di-n-hexyl ketone
2,6-dimethyl-4-heptanone
3,5-dimethyl-4-heptanone
2,4-dimethyl-3-pentanone
4,4-dimethyl-2-pentanone
1,1-diphenylacetone
1,3-diphenylacetone
9-heptadecanone
2-heptanone
3-heptanone
4-heptanone
2-hexanone
3-hexanone
2-methyl-3-hexanone
5-methyl-2-hexanone
3-methyl-2-pentanone
4-methyl-2-pentanone
10-nonadecanone
2-nonanone
5-nonanone
2-octanone
3-octanone
4-octanone
8-pentadecanone
2-pentanone
3-pentanone
phenylacetone
1-phenyl-2-butanone
2-undecanone
6-undecanone
benzophenone
4-benzyolbiphenyl
2-methylbenzophenone
4-methylbenzophenone
4-acetylbiphenyl
2-acetylfluorene
2-acetylphenanthrene
3-acetylphenanthrene
9-acetylphenanthrene
deoxybenzoin
hexanophenone
o-methylacetophenone
m-methylacetophenone
p-methylacetophenone
propiophenone
undecanophenone
valerophenone
2-adamantanone
anthrone
benzathrone
bicyclo[3.3.1]nonan-9-one
bicyclo[3.2.1]octan-2-one
4-tert-butylcyclohexanone
(+)-camphor
dl-camphor
(−)-camphor
carone
carbomenthone
cyclobutanone
cyclodecanone
cyclododecanone
cycloheptanone
cyclohexanone
cyclononanone
cyclooctanone
cyclopentadecanone
cyclopentanone
cycloundecanone
2,5-dimethylcyclopentanone
4-ethylcyclohexanone
fenchone
9-fluorenone
1-indanone
2-indanone
menthone
2-methylcyclohexanone
(+)-3-methylcyclohexanone
3-methylcyclohexanone
(+)-3-methylcyclopentanone
dl-3-methylcyclopentanone
1-methyl-2-decalone
1-methyl-2-tetralone
2-methyl-1-tetralone
4-methyl-1-tetralone
norcamphor
α-tetralone
β-tetralone
3,3,5,5-tetramethylcyclohexanone
thujone
2,2,6-trimethylcyclohexanone
verbanone
verbenone.

4. A catalyst as described in claim 1 comprising:
(a) titanium trichloride of the general formula $TiCl_3 \cdot nAlCl_3$ wherein n is from 0.00 to 0.50, which is selected from the group consisting of products produced by;
  (1) reducing titanium tetrachloride with aluminum,
  (2) reducing titanium tetrachloride with hydrogen,
  (3) reducing titanium tetrachloride with an organometallic compound, or
  (4) milling titanium tetrachloride with a Group III metal salt, in conjunction with
(b) a saturated acyclic ketone, and/or a saturated cyclic ketone,
(c) a compound selected from the group consisting of Group IA or IIA metal halides, transition metals, quanternary ammonium halide or sulfate salts, alkaline earth phosphates and alkyl alkali metal sulfates,
(d) a catalyst modifier of the formula $R_3OR_4$ wherein $R_3$ and $R_4$ are, independently, aryl, alkyl, aralkyl, or alkaryl containing up to 20 carbon atoms each.

5. A catalyst for the polymerization of α-olefins containing from 2 to 30 carbon atoms, comprising,
(a) titanium trichloride of the general formula $TiCl_3 \cdot nAlCl_3$ wherein n is from 0.00 to 0.50, which is selected from the group consisting of products produced by;
  (1) reducing titanium tetrachloride with aluminum,
  (2) reducing titanium tetrachloride with hydrogen,
  (3) reducing titanium tetrachloride with an organometallic compound, or
  (4) milling a titanium trichloride with the salt of a Group III metal salt in conjuction with
(b) a saturated acyclic or cyclic ketone, (c) a compound selected from the group consisting of Group IA or IIA metal halides, transition metals, quaternary ammonium halide or sulfate salts, alkaline earth phosphates and alkyl alkali metal sulfates, (d) an organo-aluminum halide of the formula $AlR_nX_{3-n}$ where R is a hydrocarbon radical containing from 1 to 20 carbon atoms, X is hydrogen or halogen and n is 2 or 3, and (e) a catalyst modifier of the formula $R_3OR_4$ wherein $R_3$ and $R_4$ are, independently, aryl, alkyl, aralkyl, cycloalkyl or alkaryl containing up to 20 carbon atoms.

6. A catalyst as described in claim 5 wherein the $TiCl_3$ contains $0.33AlCl_3$, the ketone is camphor, the ionic compound is sodium bromide, and the catalyst modifier is dibutyl ether.

7. A catalyst as described in claim 6 wherein
(a) comprises $TiCl_3$
(b) ketone is present at from 2.5 to 10% by weight and
(c) is present up to 1% by weight, all based on the weight of (a).

8. A catalyst as described in claim 7 wherein the aluminum/ether/titanium ratio ranges from 1/0.01/1 to 15/5/5, respectively.

9. A catalyst as described in claim 8 wherein the ether-to-aluminum ratio is from 0.01 to 1.0.

10. A catalyst as described in claim 9 wherein the aluminum/ether/titanium ratio is 3/0.5/1.0, respectively.

11. A catalyst as described in claim 10 wherein (a) has the formula $TiCl_30.33AlCl_3$.

12. A catalyst as described in claim 11 wherein the polar compound is a Group IA or IIA metal halide.

13. A catalyst as described in claim 12 wherein the ether is dibutylether.

* * * * *